United States Patent [19]

Gerber

[11] 4,255,681

[45] Mar. 10, 1981

[54] MINIATURE SYNCHRONOUS ELECTRIC MOTOR

[75] Inventor: Hermann Gerber, Münchenwiler, Switzerland

[73] Assignee: Sodeco-Saia AG, Genf, Switzerland

[21] Appl. No.: 23,947

[22] Filed: Mar. 26, 1979

[30] Foreign Application Priority Data

Apr. 13, 1978 [DE] Fed. Rep. of Germany ....... 2816098

[51] Int. Cl.³ .......................................... H02K 19/00
[52] U.S. Cl. ............................. 310/162; 310/40 MM; 310/43; 310/89
[58] Field of Search ............ 310/40 MM, 43, 49, 112, 310/114, 162–164, 89–91; 318/700

[56] References Cited

U.S. PATENT DOCUMENTS

| | | | |
|---|---|---|---|
| 3,059,131 | 10/1962 | Everard | 310/164 |
| 3,551,711 | 12/1970 | Davis | 310/162 |
| 3,571,638 | 3/1971 | Inariba | 310/164 |
| 3,633,055 | 1/1972 | Maier | 310/162 |
| 3,671,841 | 6/1972 | Hoffmann | 310/49 R |
| 3,800,175 | 3/1974 | Plotscher | 310/164 |
| 3,936,680 | 2/1976 | Kuwako | 310/40 MM |
| 4,009,406 | 2/1977 | Inariba | 310/112 |
| 4,174,485 | 11/1979 | Soden | 310/49 R |

FOREIGN PATENT DOCUMENTS

| | | | |
|---|---|---|---|
| 1429224 | 5/1973 | United Kingdom | 310/162 |
| 1460189 | 12/1976 | United Kingdom | 310/162 |

Primary Examiner—R. Skudy
Attorney, Agent, or Firm—Wender, Murase & White

[57] ABSTRACT

A miniature electric motor having substantially identical stator halves which are connected together by lugs axially interengaging on the circumference of the stator.

The lugs of the stator halves resiliently engage in pairs on a common plane between ribs formed on a plastics material ring which is located inside the stator halves and which also forms an outer protective casing for the coils and the rotor parts of the motor. The lugs may be slotted at their free ends to provide resilient shanks.

10 Claims, 4 Drawing Figures

MINIATURE SYNCHRONOUS ELECTRIC MOTOR

BACKGROUND OF THE INVENTION

The present invention relates to a miniature electric motor, more especially a miniature synchronous motor, having two identically shaped stator halves which are connected by means of lugs axially interengaging on the circumference of the stator.

In a known miniature synchronous motor of this kind (British Patent Specification No. 1,460,189, FIGS. 1 and 2) a narrow lug of one stator part engages between the pairs of lugs located symmetrically thereto of the other stator part. The lateral contact between the interengaging lugs is limited to a fraction, at the most to about half the axial length of the stator. Thus, for the magnetic flux there is only a narrow lug available on one side. Between two adjoining lugs of adjacent pairs of lugs the lateral edges of the lugs at the most are in mutal line contact, so that at this point substantially no flux can pass through. The magnetic circuit between the two stator parts is therefore relatively bad. Moreover, since the mutual connection of the stator parts occurs exclusively by edge pressure between stamped and bent metal parts, relatively narrow tolerance limits are required during manufacture.

In a further known motor of the above kind, (British Patent Specification No. 1,429,224) the lugs abut with their end faces against the opposite stator part, and only narrow anchoring extensions of the lugs engage in grooves of the stator parts. In this case also the magnetic circuit is not optimal and greatly depends upon the manufacturing accuracy.

SUMMARY OF THE INVENTION

It is the object of the present invention to provide a miniature motor of the kind described above in which the magnetic circuit between the stator parts is more effective and may be obtained without any high demands on the limits of the stamped stator parts.

According to the present invention there is provided a miniature electric motor, more especially a synchronous motor, having two substantially identically shaped stator halves which are connected by means of lugs interengaging axially on the stator circumference, wherein flat lugs appertaining to both stator parts engage in pairs located on a common plane between ribs of a plastics material ring positioned inside the lugs.

In this case only two lugs at a time of different stator parts can be in flush abutment over their whole length with their lateral edges, which provides a good magnetic circuit. Since the lugs are located in pairs between ribs of the plastics material ring, oversizing of the lugs may be accepted by slightly deforming the plastics material and the resilient lugs, i.e. very close tolerance limits are not necessary, which leads to flush but not excessive pressure against the abutting edge of the lugs. Hence it will be particularly easy for the stator parts to be joined together and possibly separated.

BRIEF DESCRIPTION OF THE DRAWINGS

The invention will now be described further, by way of example, with reference to an embodiment of a double motor or reversing motor and of a quadruple motor shown in the accompanying drawings, in which.

DETAILED DESCRIPTION OF THE DRAWING

Figure 1:
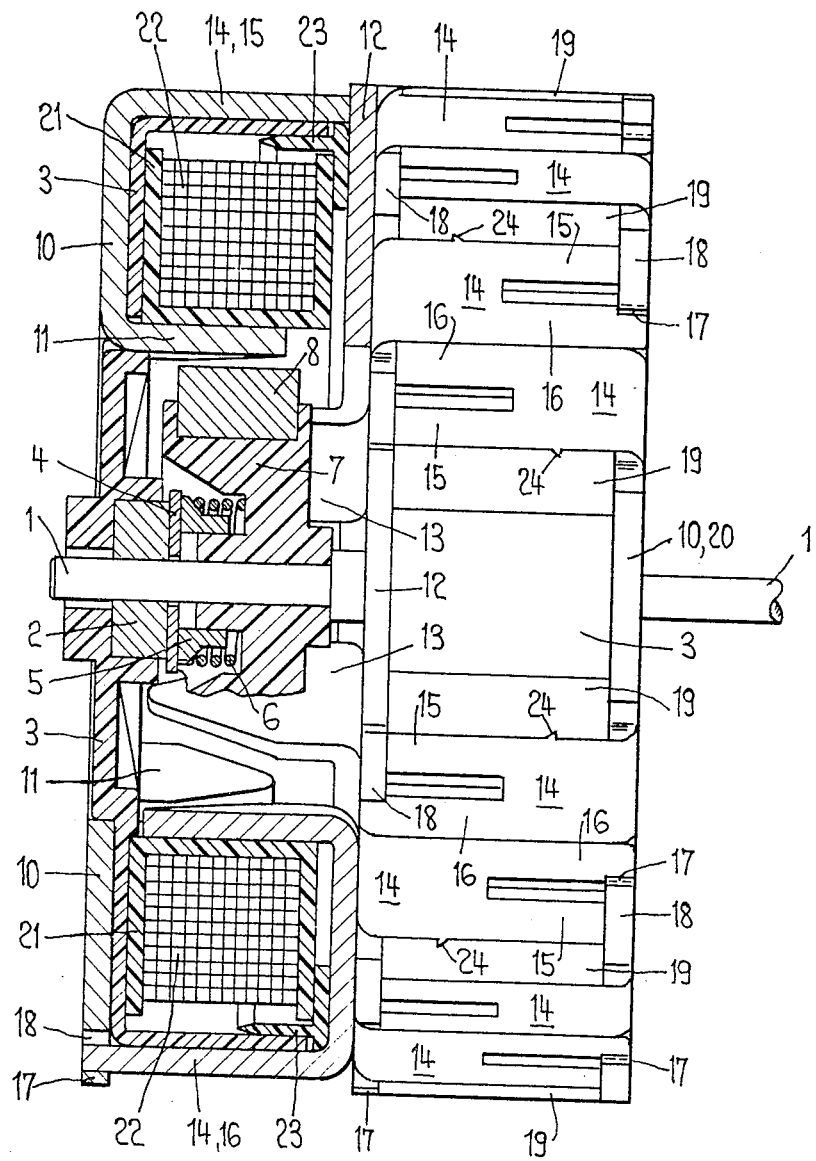
FIG. 1 shows one motor in side view, the other in axial section.
Figure 2:
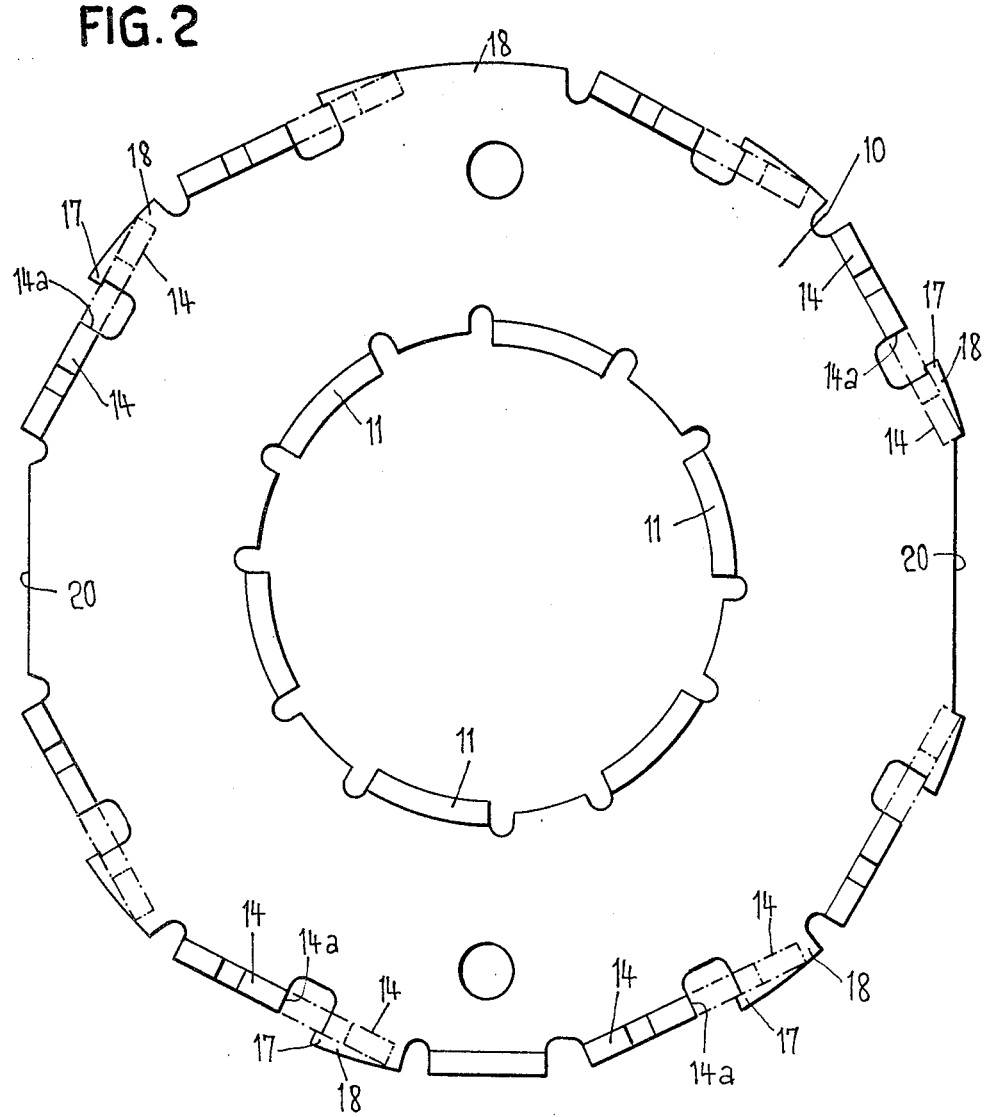
FIG. 2 is an end view of a stator part.
Figure 3:
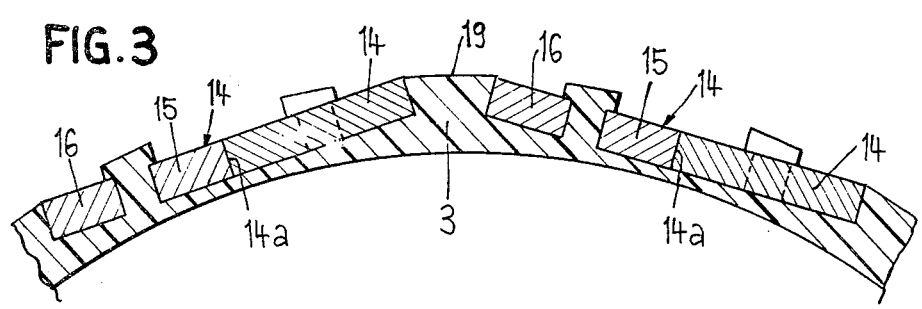
FIG. 3 is an alternative embodiment on an enlarged scale.

The motor shown in FIGS. 1 to 3 is a double motor or reversing motor, which has two identical, mechanically securely connected stators and rotors mounted on a common motor shaft 1, which motors are known per se. The common motor shaft 1 is mounted in bearings 2, one of which is mounted in the motor part shown in section and the other in the motor part not in section. The bearings 2 are each mounted in a bearing seat of the radial flange of a dish-shaped plastics material ring 3. A holding ring 5 for a compression spring 6 is supported on the bearing 2 of the motor part shown in section via a washer 4, which spring 6 is supported against the boss 7 of a rotor having a annular permanent magnet 8. The rotor is thus biased so that the other end of its boss 7, preferably with the interposition of a washer 4 bears against the bearing of the motor part shown in elevation, whereby rotor play is avoided.

Connected to the plastic material ring 3 is a stamped and bent outer stator part 10 of substantially U-shaped cross-section, the inwardly bent pole teeth 11 of which pass through slots of the plastics material ring 3. The pole teeth 11 are tapered at the free end. Each motor part also has an internal identically shaped stator part 12, the pole teeth 13 of which engage between those of the stator part 10. The stator parts 10 and 12 have flat lugs 14 bent over at right angles on their circumference which, however, are not located symmetrically at right angles to a radius on which they are located, in that one of their axial edges 14a is located further radially inwards than the other axial edge. The stator parts 10 and 12 are so shaped that in the assembled state each two lugs 14 of different stator parts are located on a common tangential plane, with their inner axial edges 14a in flush abutment with each other. In FIG. 2 the given position of the lugs of the other stator part is indicated by chain-dotted lines.

As indicated in FIG. 1, all lugs 14 have a slotted, bifurcated end with two shanks, the shorter shank 15 of which has a flat end face which abuts against the plate of the other stator part, whilst the longer shank 16 engages beneath a projection 17 protruding in circumferential direction of each tooth-like extension 18 of the other stator part and is hence located in position.

A pair of lugs 14 located in a common plane, is located in a flat groove defined between ribs 19 of the plastics material ring 3. The width of the grooves, or the distance between the ribs 19, is such that the pairs of lugs 14 fit flush between the ribs 19 and with their abutting inner edges pressed resiliently together. The mutual pressing of the pairs of lugs 14 on the one hand is determined by the resilience of the plastics material ring 3, i.e. by the readily elastic deformation of the ribs 19 subject to the lateral pressure of the abutting lugs 14, and on the other hand, also due to a certain elastic deformation of the shanks 15 and 16 of the lugs 14. Hence also the mutual position of the two stator parts in the axial and circumferential directions is clearly determined.

As shown by FIG. 1 for one position, large gaps are provided on the circumference between adjacent pairs of lugs. In FIG. 2 this corresponds to the extended teeth 18 and the flat edge members 20 respectively. At these positions connecting cables, not shown, may be passed radially out through the plastics material ring 3. Over the diametrically opposite positions 20 a securing member, not shown, may be located so that this member does not radially protrude beyond the housing of the motor parts.

Between the stator parts 10 and 12 a coil body 21 with a coil 22 is inserted, and between the stator part 12 and the coil body 21 an isolating ring 23 is inserted.

As already mentioned, the two stator parts 10 and 12 are held together by the lateral pressure of the pairs of lugs 14 in the grooves of the plastics material part 3. To facilitate assembly, the base of the flat grooves in which the lugs are inserted may have slightly inclined surfaces. To improve the hold of the lugs on the plastics material ring 3 and hence improve the mutual connection of the two stator parts, the edges of the lugs 14 abutting against the ribs 19 of the plastics material ring 3 may be provided with barbs 24 which dig into the plastics material and make separation of the stator part mounted on the plastics material ring difficult.

In FIG. 3, an alternative embodiment is shown in accordance with which the plastics material ring 3 has T-shaped retaining ribs engaging in the slot between the shanks 15 and 16 and radially secure the lugs 14. In this case both shanks 15 and 16 may be of the same length and their end faces abut against the opposite stator part, as shown for the shanks 15 of the first embodiment.

With shorter shanks 15 of the lugs 14, in accordance with FIG. 3, the possibility of aligning both shanks at the opposite stator part, simplifies the manufacture in that the mutual axial position of the joined together stator parts is accurately determined by the ends of the shanks 15. This also provides special advantages during the manufacture of the double motor shown, wherein the inner stator parts 10 and 12 are first placed one upon the other and interconnected, e.g. welded together. Then the remaining parts are inserted, such as coils 21, 22 isolating rings 23 and the rotor, then the plastics material rings 3 are mounted. The two outer stator parts 10 and 12 are then mounted and the two motor parts may be mutually pressed together until the shanks 15 of the lugs 14 assume a position abutting the opposite stator parts. Hence it is not necessary for the path of the press to be accurately dimensioned, since the axial dimensions of each motor part is determined by abutment, and it is only necessary for the pressure of the press to be appropriately determined.

A further advantage of the motor compared with the said known motor consists in that the plastics material ring 3 seals the interior space and hence protects its against contamination.

Various alternative embodiments are possible. Thus, e.g. it is also possible for the motor bearings to be arranged in a conventional manner in further inwardly drawn stator parts 10 and 12. In the case of a single motor having two stator parts and one exciter coil, of course, only one plastics material ring 3 is provided in which a motor bearing may be accommodated.

If in this case use is also to be made of the advantage that accurate identically shaped stator parts are used, the second motor bearing should be secured in a further bearing holder. For example, it would also be possible for the isolating ring 23 to be drawn further inwards and centered on the abutting stator part in the same manner as the plastics material ring 3 is centered and acts as a support carrier for the second bearing.

The manufacture of motors of the kind shown comprised of two or more modules from two stator halves each having a rotor and a winding is particularly facilitated by the fact that they only have parts locate outside the rotor circumference with bent-over stator poles. It is therefore possible, before mounting the last outer stator part, to insert laterally a rotor with several permanent magnets 8 and then to mount the last stator part with the plastics material ring 3 and the bearing 2. The same procedure is possible with motors having more than two modules, whereby, however, the plastics material rings 3 of the interposed modules will have to be provided with a central opening which permits the rotor to pass through.

Figure 4:
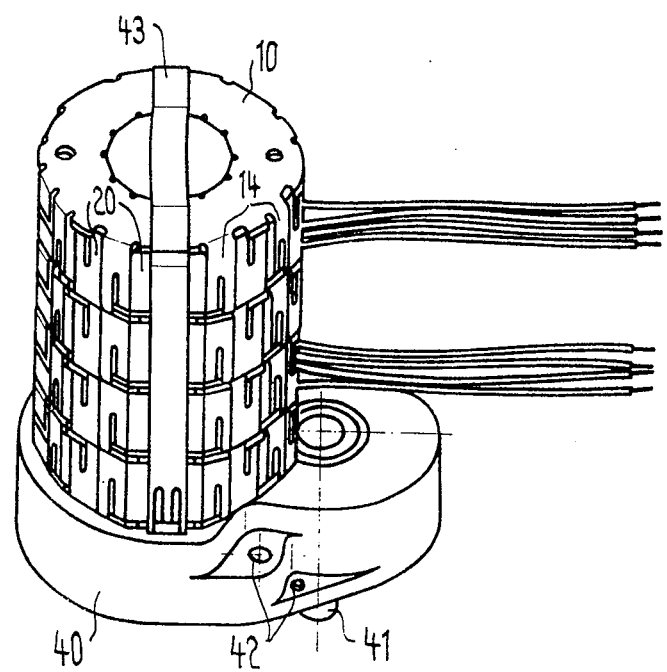
FIG. 4 is a perspective view of the quadruple motor.

FIG. 4 shows a quadruple motor having four units as shown in FIGS. 1–3 and as explained above. The rotors of these units are mounted on a common shaft, not shown, which extends into a reduction gear of which the casing 40 and the driven shaft 41 are shown. The casing 40 has holes 42 for fixing it by means of screws. A U-shaped securing member or bracket 43 is applied with its side portions at positions 20 as mentioned above and is secured with its lower ends to the casing 40 in a suitable manner not shown in detail. In this way the motor is secured to the reduction gear to form a driving unit therewith. The quadruple motor shown in FIG. 4 may be used when a relatively high torque is needed.

What we claim is:

1. A miniature electric motor, more especially a synchronous motor, comprising:
    a first stator half and a substantially identically shaped second stator half, said stator halves having a common center axis;
    each said stator half having pole teeth bent inwardly parallel to said axis wherein said pole teeth of said first stator half interpose said pole teeth of said second stator half in a circumferentially spaced relationship about said axis;
    a rotor positioned along said axis inside said pole teeth;
    a coil positioned radial to said axis outside said pole teeth;
    each said stator half further having connecting lugs bent inwardly parallel to said axis along a circumference thereof and outside said coil wherein said connecting lugs of said first stator half circumferentially engage said connecting lugs of said second stator half; and
    a ring of a plastics material parallel to said stator halves and having circumferential ribs extending parallel to said axis inside said connecting lugs, wherein each pair of connecting lugs, including a first connecting lug from said first stator half and a second connecting lug from said second stator half, is located in a common plane between said ribs with the lateral surface of said first connecting lug in full contact with the lateral surface of said second connecting lug.

2. A motor according to claim 1, in which the free ends of said connecting lugs are divided by slots into two resilient shanks.

3. A motor according to claim 2, in which said shanks are unequal in length wherein the end face of the shorter shank of one of said stator halves abuts against the other stator half, while the longer shank engages beneath a projection of said other stator half.

4. A motor according to claim 1, in which said plastics material ring carries a motor bearing and simultaneously acts as a radially isolating covering for said coil.

5. A motor according to claim 1, comprising two directly interconnected inner stator halves and two outer stator halves, whereby each pair of said stator halves form a motor module having a rotor and a coil associated therewith, said rotors being mounted on a common shaft.

6. A motor according to claim 5, in which each of said two outer stator havles has a plastics material ring associated therewith and each of said plastics material rings includes a bearing on which said shaft is mounted.

7. A motor according to claim 5 or 6, having more than two said motor modules, in which the plastics material ring of an intermediary motor module has a central opening which permits the passage therethrough of said rotor.

8. A motor according to claim 1, in which each of said stator halves in the region of a groove in the circumference of said plastics material ring has no connecting lugs and does not radially engage in said groove, such that a securing member can be arranged in said groove.

9. A motor according to claim 1, in which both said stator halves are shaped exactly identically.

10. A motor according to claim 9, in which a first motor bearing is located in said plastics material ring and a second motor bearing is located in another plastics material part.

* * * * *